(12) United States Patent
Badihi

(10) Patent No.: US 10,365,445 B2
(45) Date of Patent: Jul. 30, 2019

(54) OPTICAL MODULES INTEGRATED INTO AN IC PACKAGE OF A NETWORK SWITCH HAVING ELECTRICAL CONNECTIONS EXTEND ON DIFFERENT PLANES

(71) Applicant: Mellanox Technologies, Ltd., Yokneam (IL)

(72) Inventor: Avner Badihi, D.N. Harey Yehuda (IL)

(73) Assignee: Mellanox Technologies, Ltd., Yokneam (IL)

( * ) Notice: Subject to any disclaimer, the term of this patent is extended or adjusted under 35 U.S.C. 154(b) by 121 days.

(21) Appl. No.: 15/494,578

(22) Filed: Apr. 24, 2017

(65) Prior Publication Data

US 2018/0306990 A1  Oct. 25, 2018

(51) Int. Cl.
*G02B 6/44* (2006.01)
*G02B 6/42* (2006.01)

(52) U.S. Cl.
CPC ........... *G02B 6/4274* (2013.01); *G02B 6/428* (2013.01); *G02B 6/4269* (2013.01); *G02B 6/4284* (2013.01); *G02B 6/4448* (2013.01); *G02B 6/4452* (2013.01)

(58) Field of Classification Search
CPC .... G02B 6/4246; G02B 6/4284; G02B 6/428; G02B 6/4281; G02B 6/43; G02B 6/3817; H01L 2225/06506; H05K 1/0274; H05K 1/183; H01R 43/205
USPC .............................................. 250/239, 214 R
See application file for complete search history.

(56) References Cited

U.S. PATENT DOCUMENTS

| | | |
|---|---|---|
| 3,855,427 A | 12/1974 | Sinden |
| 4,732,446 A | 3/1988 | Gipson et al. |
| 5,054,870 A | 10/1991 | Losch et al. |
| 5,184,961 A | 2/1993 | Ramirez et al. |
| 5,199,087 A | 3/1993 | Frazier |
| 5,475,778 A | 12/1995 | Webb |
| 5,535,036 A | 7/1996 | Grant |
| 5,692,910 A | 12/1997 | Mittal |
| 6,215,654 B1 | 4/2001 | Wilkie, II et al. |
| 6,267,628 B1 | 7/2001 | Meckley et al. |
| 6,343,171 B1 | 1/2002 | Yoshimura et al. |
| 6,385,361 B1 | 5/2002 | Corr |
| 6,393,183 B1 | 5/2002 | Worley et al. |
| 6,399,964 B1 | 6/2002 | Corr |
| 6,504,841 B1 | 1/2003 | Larson et al. |

(Continued)

OTHER PUBLICATIONS

Custom Interconnects LLC, "Fuzz Buttons", 2 pages, Oct. 18, 2016.

(Continued)

*Primary Examiner* — Que Tan Le
(74) *Attorney, Agent, or Firm* — Kligler & Associates

(57) ABSTRACT

An apparatus includes, an Integrated Circuit (IC), first electrical connections and second electrical connections. The IC is mounted on a substrate and is configured to exchange one or more communication signals with one or more electro-optical transducers, and to exchange one or more control signals with external circuitry. The first electrical connections extend from the IC on a plane parallel to the substrate, and are configured to conduct the communication signals. The second electrical connections extend from the IC on one or more planes not parallel to the substrate, and are configured to conduct the control signals.

20 Claims, 8 Drawing Sheets

(56) References Cited

U.S. PATENT DOCUMENTS

| | | | |
|---|---|---|---|
| 6,512,861 B2 | 1/2003 | Charkavorty et al. | |
| 6,574,687 B1 | 6/2003 | Teachout | |
| 6,611,635 B1 | 8/2003 | Yoshimura et al. | |
| 6,654,515 B2 * | 11/2003 | Kato | G02B 6/43 385/129 |
| 6,684,007 B2 | 1/2004 | Yoshimura et al. | |
| 6,690,845 B1 | 2/2004 | Yoshimura et al. | |
| 6,706,546 B2 | 3/2004 | Yoshimura et al. | |
| 6,713,755 B1 | 3/2004 | Iwasa | |
| 6,821,029 B1 | 11/2004 | Grung et al. | |
| 6,845,184 B1 | 1/2005 | Yoshimura et al. | |
| 6,945,712 B1 | 9/2005 | Conn | |
| 7,200,295 B2 | 4/2007 | Rolston et al. | |
| 7,359,643 B2 * | 4/2008 | Aronson | G02B 6/4246 398/136 |
| 7,362,941 B2 | 4/2008 | Rinderer et al. | |
| 7,435,097 B2 | 10/2008 | Mecker | |
| 7,510,421 B2 | 3/2009 | Fransen et al. | |
| 7,539,376 B2 | 5/2009 | Bozso et al. | |
| 7,698,491 B1 | 4/2010 | King, Jr. et al. | |
| 7,706,361 B2 | 4/2010 | McMillen et al. | |
| 7,729,581 B2 | 6/2010 | Rolston et al. | |
| 7,974,105 B2 | 7/2011 | Dean, Jr. et al. | |
| 7,983,194 B1 | 7/2011 | Genetti et al. | |
| 3,060,682 A1 | 11/2011 | Genetti et al. | |
| 3,068,351 A1 | 11/2011 | Figueroa et al. | |
| 8,259,450 B2 | 9/2012 | Dunwoody et al. | |
| 8,270,830 B2 | 9/2012 | Kirkpatrick et al. | |
| 8,371,860 B2 | 2/2013 | Xiang et al. | |
| 8,410,364 B2 | 4/2013 | Dunwoody et al. | |
| 8,411,465 B2 | 4/2013 | Dean, Jr. et al. | |
| 8,441,793 B2 | 5/2013 | Dunwoody et al. | |
| 8,452,140 B2 | 5/2013 | Yen et al. | |
| 8,588,561 B2 | 11/2013 | Zbinden et al. | |
| 8,588,562 B2 | 11/2013 | Zbinden et al. | |
| 8,749,986 B1 | 6/2014 | Peterson et al. | |
| 8,787,711 B2 | 7/2014 | Zbinden et al. | |
| 8,905,632 B2 | 12/2014 | Shastri et al. | |
| 9,002,155 B2 | 4/2015 | Li et al. | |
| 9,031,107 B2 | 5/2015 | Shastri et al. | |
| 9,118,144 B2 | 8/2015 | Hasse et al. | |
| 9,166,312 B2 | 10/2015 | Bakatsias et al. | |
| 9,374,165 B2 | 6/2016 | Zbinden et al. | |
| 9,423,578 B2 | 8/2016 | Lai et al. | |
| 9,531,645 B2 | 12/2016 | Loiferman et al. | |
| 9,554,461 B2 | 1/2017 | Kato | |
| 9,584,373 B2 | 2/2017 | Schlansker et al. | |
| 9,697,160 B2 | 7/2017 | Genetti et al. | |
| 2002/0018339 A1 | 2/2002 | Uzuka et al. | |
| 2002/0191649 A1 | 12/2002 | Woodring | |
| 2005/0191003 A1 | 9/2005 | Yorks et al. | |
| 2006/0087013 A1 * | 4/2006 | Hsieh | H01L 25/0652 257/678 |
| 2007/0294520 A1 | 12/2007 | Leigh et al. | |
| 2008/0062655 A1 | 3/2008 | Laursen et al. | |
| 2008/0222351 A1 | 9/2008 | Verdiell et al. | |
| 2010/0254652 A1 | 10/2010 | Kirkpatrick et al. | |
| 2013/0028256 A1 | 1/2013 | Koren et al. | |
| 2014/0056174 A1 | 2/2014 | Walden et al. | |
| 2014/0259650 A1 | 9/2014 | Carter et al. | |
| 2015/0351233 A1 | 12/2015 | Peterson et al. | |
| 2017/0063730 A1 | 3/2017 | Loiferman et al. | |

OTHER PUBLICATIONS

Amphenol TCS, "TB-2324—General Product Specification for Paladin TM Interconnect Systems", Revision "F", 11 pages, 2017.
U.S. Appl. No. 15/350,127 office action dated Mar. 9, 2018.
U.S. Appl. No. 15/350,127 office action dated Aug. 11, 2017.
U.S. Appl. No. 15/582,705 office action dated Oct. 20, 2017.

* cited by examiner

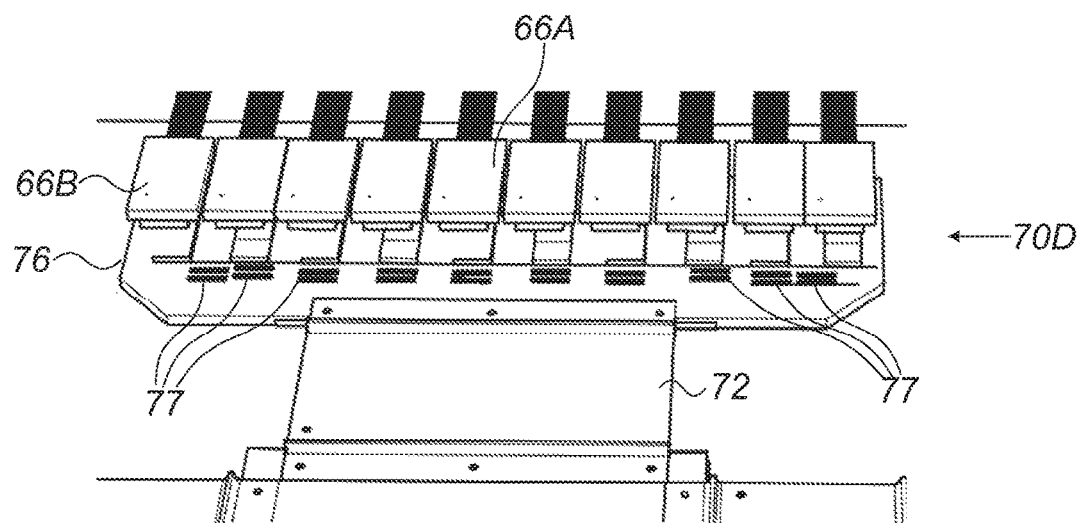
FIG. 5A
FIG. 5B
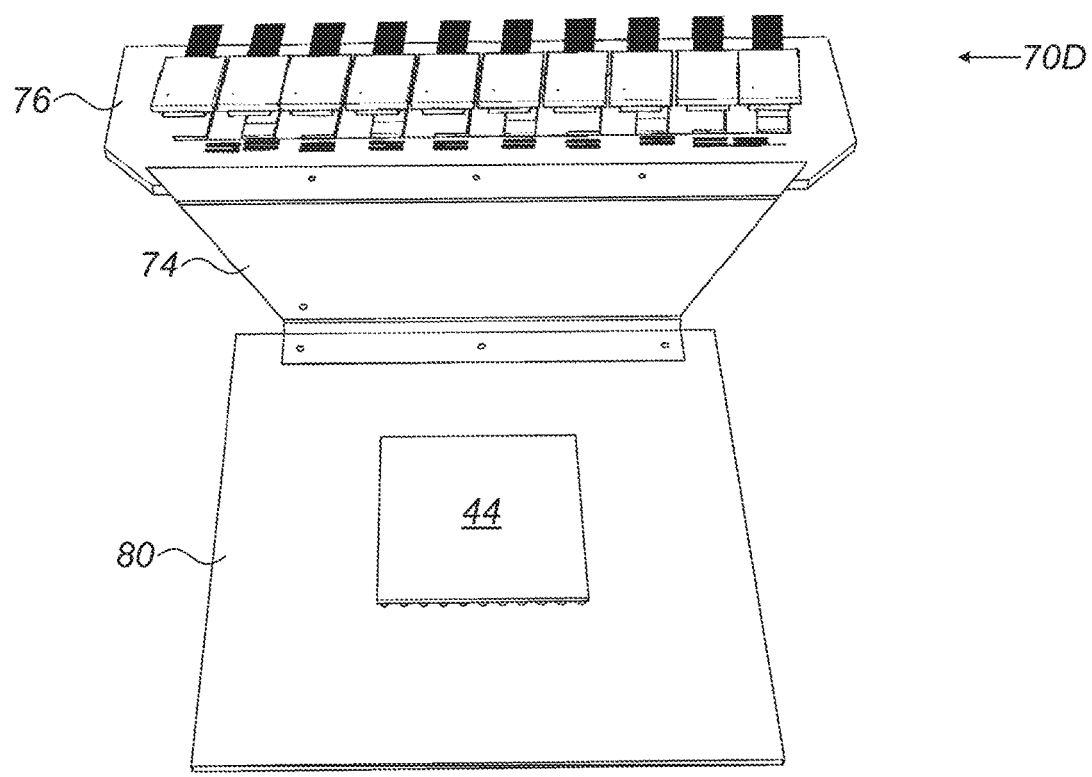

OPTICAL MODULES INTEGRATED INTO AN IC PACKAGE OF A NETWORK SWITCH HAVING ELECTRICAL CONNECTIONS EXTEND ON DIFFERENT PLANES

FIELD OF THE INVENTION

The present invention relates generally to network switches, and particularly to methods and systems for integrating optical modules into a package of an integrated Circuit (IC) of a network switch.

BACKGROUND OF THE INVENTION

Optical-electrical systems, such as network switches, may comprise an integrated circuit (IC) package that connects the IC to optical fibers.

For example, U.S. Pat. No. 7,200,295, whose disclosure is incorporated herein by reference, describes self-contained optical hybrid IC (OHIC) package for optical side-coupling to an optical waveguide of a printed wiring board (PWB). The OHIC package comprises an integrated circuit (IC) package. The OHIC further comprises a self-contained optical subassembly (OSA) having an optical coupling facet and being adapted to be bonded to the integrated circuit (IC) package.

U.S. Pat. No. 7,729,581, whose disclosure is incorporated herein by reference, describes an optically-enabled integrated circuit (IC) package for connecting an electrical circuit board to an optical fiber. The IC package comprises an optical subassembly (OSA) having a laser which is pre-aligned with the optical fiber. The OSA further comprises a standard electrical interface for the connection to the microchip and a standard optical interface for the connection to the optical fiber.

SUMMARY OF THE INVENTION

An embodiment of the present invention that is described herein provides an apparatus including an Integrated Circuit (IC), first electrical connections and second electrical connections. The IC is mounted on a substrate and is configured to exchange one or more communication signals with one or more electro-optical transducers, and to exchange one or more control signals with external circuitry. The first electrical connections extend from the IC on a plane parallel to the substrate, and are configured to conduct the communication signals. The second electrical connections extend from the IC on one or more planes not parallel to the substrate, and are configured to conduct the control signals.

In some embodiments, the second electrical connections are configured to conduct electrical power from an external power source. In other embodiments, the first electrical connections include a jumper, which is configured to conduct the communication signals between the substrate and the electro-optical transducers. In yet other embodiments, the jumper has a shape selected from a list consisting of rectangular, square, and trapezoid.

In an embodiment, the jumper includes one or more components selected from a list consisting of printed circuit board (PCB), flexible PCB, and liquid crystal polymer (LCP). In another embodiment, the jumper includes multiple stripes that each is configured to conduct one or more of the communication signals between the substrate and a respective electro-optical transducer. In yet another embodiment, the substrate includes first electrical attachment pads connected to the first electrical connections, and second electrical attachment pads connected to the second electrical connections.

In some embodiments, the second electrical connections include a mezzanine connector, which includes multiple connecting pins. In other embodiments, the apparatus includes (i) a first heat dissipation module, which is configured to transfer first heat from the IC to a heat sink, and (ii) a second heat dissipation module, which is configured to transfer second heat from the electro-optical transducers to the heat sink. In yet other embodiments, the first and second heat dissipation modules are thermally isolated from one another.

In an embodiment, the first and second heat dissipation modules are thermally connected to one another. In another embodiment, at least one of the first and second heat dissipation modules is configured to transfer heat using heat conduction. In yet another embodiment, at least one of the first and second heat dissipation modules is configured to transfer heat using a combination of heat conduction and heat convection.

In some embodiments, at least one of the first and second heat dissipation modules is configured to transfer heat using heat convection. In other embodiments, one of the first and second heat dissipation modules, which is configured to transfer the heat using heat convection, includes one or more heat pipes configured to run a cooling fluid. In yet other embodiments, the second heat dissipation module includes one or more heat slugs, each heat slug that includes a fastener, which is configured to couple the heat slug to a corresponding electro-optical transducer.

In an embodiment, the electro-optical transducers include first and second electro-optical transducers that differ in size, and the heat slugs include a first heat slug, which is configured to couple to the first electro-optical transducer, and a second heat slug, which is configured to couple to the second electro-optical transducer. In another embodiment, the first and second heat slugs differ in size.

There is additionally provided, in accordance with an embodiment of the present invention, a method including exchanging one or more communication signals between an Integrated Circuit (IC) and one or more electro-optical transducers, via first electrical connections that extend from the IC on a plane parallel to a substrate on which the IC is mounted. One or more control signals are exchanged between the IC and external circuitry, via second electrical connections that extend from the IC on one or more planes not parallel to the substrate.

There is further provided, in accordance with an embodiment of the present invention, a method including mounting an Integrated Circuit (IC) on a substrate. The IC is connected to one or more electro-optical transducers using first electrical connections that conduct communication signals, the first electrical connections extend from the IC on a plane parallel to the substrate. The IC and external circuitry are connected to one another using second electrical connections that conduct control signals, the second electrical connections extend from the IC on one or more planes not parallel to the substrate.

The present invention will be more fully understood from the following detailed description of the embodiments thereof, taken together with the drawings in which:

BRIEF DESCRIPTION OF THE DRAWINGS

FIGS. 5A and 5B are schematic, pictorial illustrations of flexible jumpers of a switch, in accordance with embodiments of the present invention;

DETAILED DESCRIPTION OF EMBODIMENTS

Overview

Figure 1:
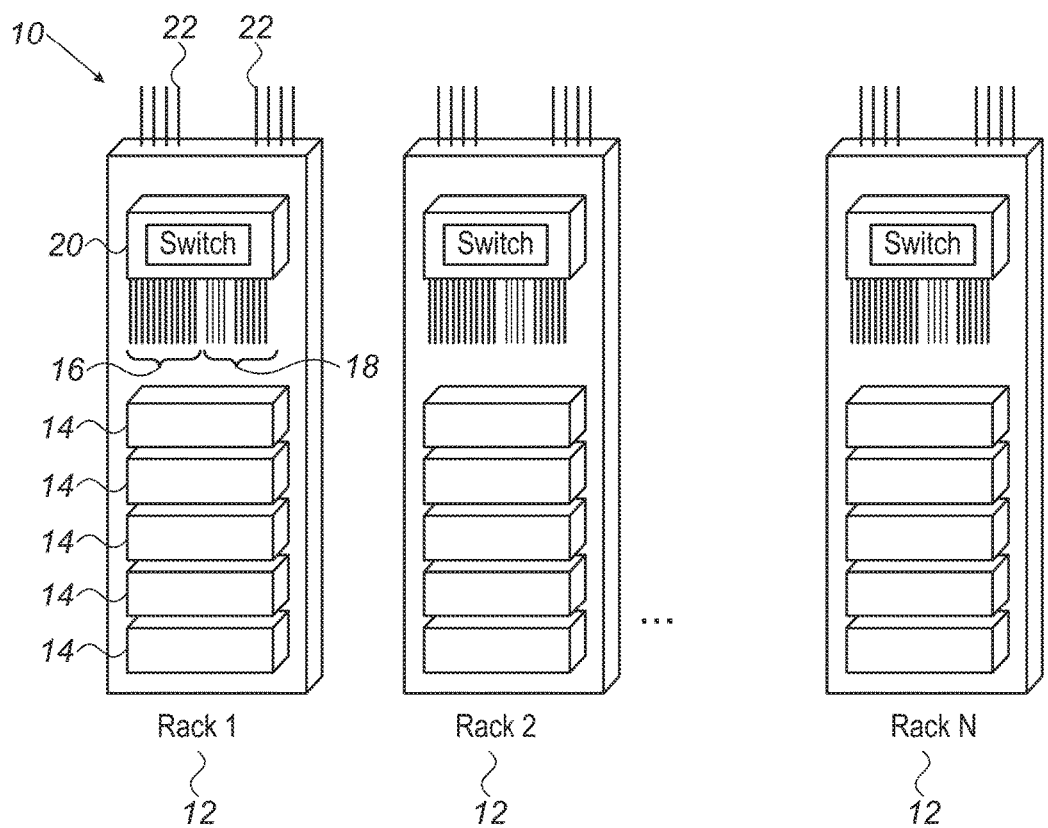
FIG. 1 is a schematic, pictorial illustration of a data center, in accordance with an embodiment of the present invention.

Network switches are used as network building blocks, for example in data centers that support high data rates of high-speed communication signals on the order of GigaBits per second (GBPS) or even TeraBits per second (TBPS). The signals are typically routed from source (e.g., an end node) to destination (e.g., another end node) via one or more entities of the network, such as switches and servers. Each transmission of the signals between two of the entities is referred to as a hand-over point (HOP).

In practice, usable data rates are limited because high data rates make the signals prone to poor signal integrity and high attenuation loss, resulting in short transmission ranges between the entities, and a large number of HOPs, which reduce the routing effectiveness and increase the cost of communication networks.

Furthermore, active devices in the switch, such as Integrated circuits (ICs) and electro-optical modules, may produce excessive heat at high data rates, which may cause operational failures. In the description that follows, for the sake of clarity, the terms "electro-optical module," "electro-optical transducer" and "optical module" are used interchangeably. Such modules are configured to convert between electrical and optical signals.

Embodiments of the present invention that are described hereinbelow provide improved techniques for transmitting communication signals at high data rates over long transmission ranges between network entities with minimal degrading in the quality of transmission (e.g., signal integrity), thereby reducing the number of HOPs required.

In principle, high-speed transmission over optical fibers typically provides better signal integrity and enables higher distance between the entities (e.g., from 3 meters to 100 meters) compared to transmission over electrical cables.

In some embodiments that are described herein, the signal integrity improves and the distance between entities (e.g., switches) increases by incorporating electro-optical transducers into a package or a switch IC. In some embodiments, the IC exchanges high-speed electrical signals with transducers that are located at a distance on an order of a few centimeters from the IC (and therefore the signals are not perceptibly degraded). The transducers convert the electrical signals to optical signals, within the package, and transmit the optical signals over the optical fiber to the next switch. Alternatively or additionally, the high-speed electrical signals may be transmitted (e.g., by the IC) over electrical cables to a destination or entity (e.g., a server or another switch) located within a short distance (e.g., up to 3 meters, depending on the data rate).

In some embodiments, in addition to the high-speed electrical signals, the IC further exchanges low-speed signals, such as bus control and power signals, with external circuitry and a power supply unit, respectively. These low-speed signals can typically be transmitted over electrical cables or printed circuit board traces with sufficient reliability.

In some embodiments, the IC, which is mounted on a substrate, exchanges the high-speed and low-speed signals over different channels. In an example embodiment, the high-speed communication signals are transmitted on a plane parallel to the substrate, and the low-speed control and power signals are transmitted in one or more planes orthogonal to the substrate. In the present context, the term "communication signals" refers to signals that convey user data. The term "control signals" refers to signals that convey control information rather than user data.

In some embodiments, the disclosed techniques enable reducing the size (e.g., width) of the transducers, so as to increase the overall number of transducers (and therefore, ports) that can be incorporated within a single switch. This embodiment increases the capacity of the switch, thereby reducing the number of HOPs required for between the source and destination.

In some embodiments, the switch comprises a flexible jumper that serves as a high-speed connection bridge between the IC and transducers, which may have their input/output (I/O) ports positioned at different respective heights relative to the substrate. In an embodiment, the shape of the jumper (e.g., rectangular, trapezoid) is adapted to the geometry and number of the transducers so as to optimize the signal transmission speed within the switch.

The active devices of the switch. (e.g., IC and transducers) that produce excess heat, may operate at different respective temperatures. In some embodiments, the switch comprises two heat dissipation modules, e.g., one for the IC and another for the electro-optical transducers. Each heat dissipation module is configured to maintain the temperature of its respective device below a specified maximal temperature. In some embodiments, each of the heat dissipation modules applies heat conduction, heat convection or a combination thereof.

System Description

FIG. 1 is a schematic, pictorial illustration of a data center 10, in accordance with an embodiment of the present invention. Data center 10 may be used, for example, for data communications and data storage, using communications protocols such as Ethernet or Infiniband.

In some embodiments, data center 10 comprises multiple electronic racks 12. Each rack 12 comprises multiple servers 14, which are configured to store and process the data. In some embodiments, each server 14 is connected to one or more communication switches 20, e.g., a primary switch and a redundancy switch, or any other suitable configuration. Each switch 20 is configured to exchange communication signals between servers locate within the same rack, between racks 12 of data center 10, and/or between racks 12 located at remote data centers (not shown).

In some embodiments, rack 12 further comprises optical fibers 16 and electrical cables 18, which are configured to conduct the communication signals between serves 14 and switch 20. In other embodiments, rack 12 may comprise only fibers 16 or only cables 18. In an embodiment, connections (which may be optical and/or electrical) are extended from switch 20 on rack 12 so as to conduct the communication signals between racks 12 located at the same data center 10, or at another data center (not shown). In some embodiments, connections 22 may comprise optical fibers, configured to conduct the signals to remote racks, and/or electrical cables, typically made from copper, which are configured to conduct the signals within rack 12 or between racks 12 located in close proximity (e.g., 3 meters) to one another.

In the example of FIG. 1, racks 12 are all arranged in a Top of Rack (ToR) switch configuration, in which switch is mounted at the upper part of rack 12. In other embodiments, switch 20 may be arranged in rack 12 using any other suitable configuration, such as Middle of Rack (MoR). Furthermore, data center 10 may comprise any suitable combination of ToR, MoR or other configurations of racks 12.

Figure 2:
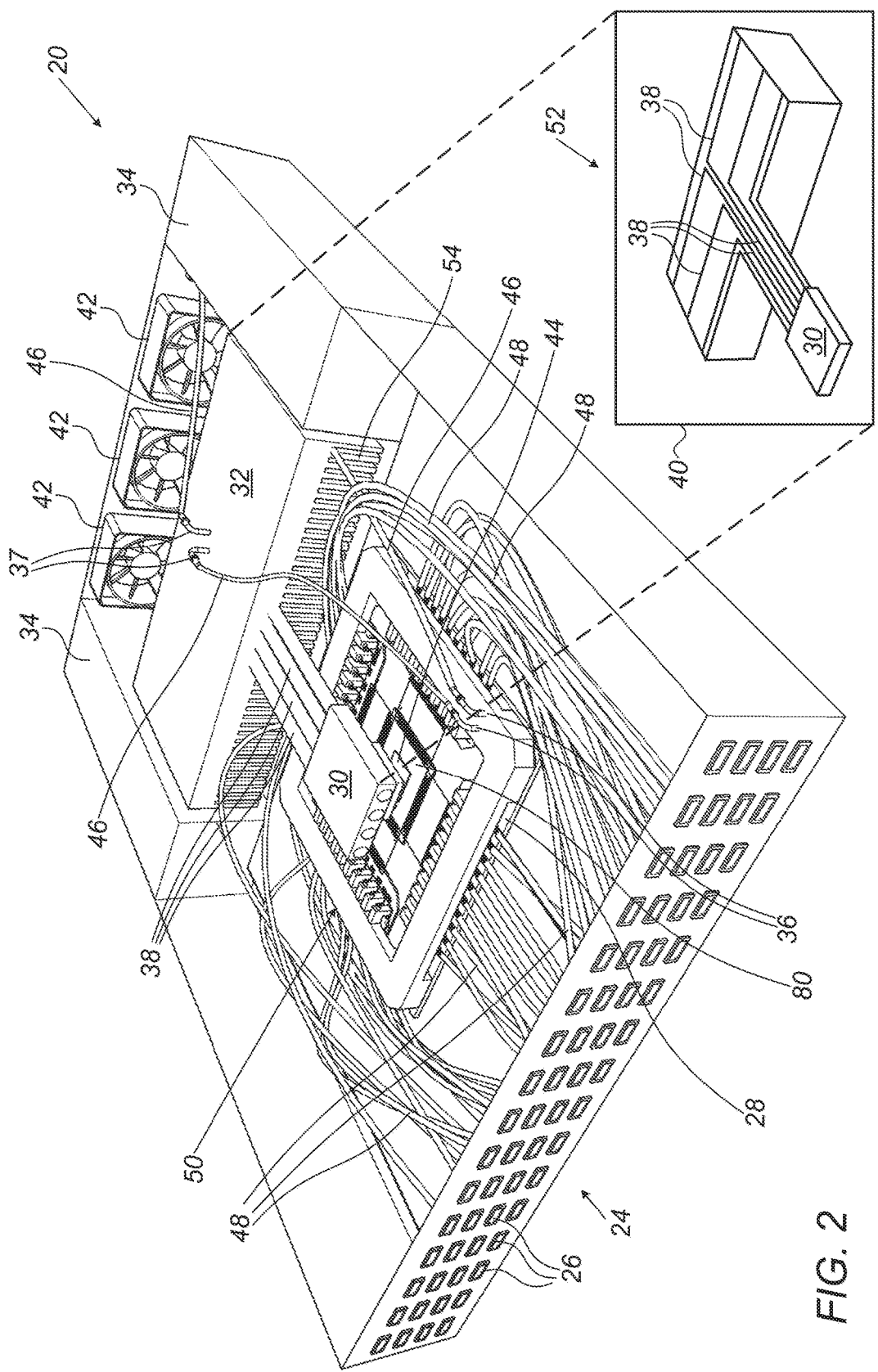
FIG. 2 is a schematic, pictorial illustration of a communication switch, in accordance with an embodiment of the present invention.

FIG. 2 is a schematic, pictorial illustration of switch 20, in accordance with an embodiment of the present invention. In some embodiments, switch 20 comprises a front panel 24, which comprises multiple (e.g., up to sixty-four or seventy-two and above) connectors 26. Each connector 26 is an input/output (I/O) port, which is configured to connect between switch 20 and one or more connections, such as connections 22, fibers 16 and cables 18.

In an embodiment, panel 24 may comprise multiple types of connectors 26, such as electrical connectors, single-fiber connectors, dual-fiber connectors or Multi-fiber Push-On (MPO) MTP® connectors. In some embodiments, switch 20 comprises one or more power supply units (PSU) 34, which are configured to supply electrical power to the various devices of switch 20, as will be described below.

Heat Dissipation from Active Devices of the Switch

In some embodiments, switch 20 comprises two types of active devices, such as a switching Integrated Circuit (IC) 44, and optical modules (denoted and shown in detail in FIG. 4 below). Each of the active devices produces heat during operation. In an embodiment, switch 20 comprises heat dissipation modules that are configured to dissipate the heat away from the active devices, for example to a heat sink 32. In the description that follows, for the sake of clarity, the terms "heat dissipation module" and "cooling module" are used interchangeably.

In some embodiments, switch 20 comprises an IC cooling module 52 (shown in an inset 40), which is configured to dissipate excess heat produced by IC 44, and is described in detail below. In an embodiment, switch 20 further comprises a cooling module for the optical modules that will be depicted in FIG. 3 below.

In some embodiments, the cooling modules of switch 20 may apply two (referred to as "first" and "second" below) heat dissipating techniques that can function independently or in conjunction. The first technique dissipates the heat using a combination of heat conducting elements, such as heat pipes 38, and heat convection using air flow produced by one or more fans 42.

In an embodiment, the second technique dissipates the heat solely by convection, using fluids, such as water (or other cooling liquids) or gas that flows in heat transfer elements and tubes. In another embodiment, the second technique may apply the air flow produced by fans 42 in conjunction with the fluid convection described above.

In some embodiments, switch 20 comprises a support plate 28, which is configured to conduct heat from the active devices. In some embodiments, support plate 28 is typically made from copper, which has high thermal conductivity, and may further comprise cooling pipes (not shown) that improve the heat transfer from the active devices using running fluids, such as water (or other cooling liquids) or gas.

In some embodiments, switch 20 comprises a thermo-mechanical frame 50, which is configured to provide mechanical support to switch 20 and to dissipate heat from the optical modules. Frame 50 and additional components comprised in the cooling module of the optical module are depicted in detail in FIG. 3 below.

In some embodiments, switch 20 comprises optical fibers 48, which are configured to connect between the optical modules and connectors 26. In other embodiments, switch 20 comprises electrical cables instead of, or in conjunction with, fibers 48.

In some embodiments, switch 20 comprises one or more ICs, such as switching IC 44, which is mounted on a package substrate 80. In an embodiment, IC 44 is configured to exchange one or more communication signals with electro-optical transducers (shown in FIG. 4) of the optical modules, and to exchange one or more control signals (e.g., bus control signals) with external circuitry (not shown).

In some embodiments, switch 20 comprises a heat spreader 30 (part of module 52), which is thermally coupled to IC 44 and is configured to conduct the excessive heat from IC 44, via heat pipes 38, into heat sink 32 for heat dissipation.

Reference is now made to inset 40 that depicts IC cooling module 52. Heat spreader 30 transfers the heat produced by IC 44 to heat pipes 38 that fan-out into heat sink 32, so as to dissipate the excessive heat across heat sink 32.

In some embodiments, heat pipes 38 are hollow, and are configured to contain the fluids, so as to dissipate the heat using the convection techniques described above. In other embodiments, heat pipes 38 are replaced, for example, by solid rods (not shown) that are not hollow and are made from a heat conducting material, such as copper, so as to dissipate the heat using the conduction technique described above. Additionally or alternatively, heat pipes 38 may be hollow so as to dissipate the heat using a combination of the convection and conduction techniques.

In some embodiments, heat sink 32 comprises cooling fins 54, which are configured to increase the heat dissipation rate from heat sink 32 (by increasing the effective surface-to-volume ratio of heat sink 32) in the presence of airflow from fans 42.

In some embodiments, two pairs of tubing nipples 36 and 37 are mounted on frame 50 and heat sink 32, respectively. In an embodiment, switch. 20 comprises three fluid pipes 46. A first fluid pipe 46 connects between one of nipples 36 and a first external fluid supply that supplies cool fluid (not shown).

A second fluid pipe 46 connects between a second nipple 36 to a corresponding nipple 37 on heat sink 32, and a third pipe 46 connects between the second nipple 37 on heat sink 32 and a second external fluid supply returning the heated fluid (not shown).

In another embodiment, a first fluid pipe 46 connects between one of nipples 36 and an external fluid supply (not shown) supplying cool fluid.

A second fluid pipe 46 connects between the second nipple 36 and an external fluid supply not shown) returning the heated fluid.

In an alternative embodiment, each nipple 36 is connected to a corresponding nipple 37 using fluid pipe 46, so as to exchange the fluids between frame 50 and sink 32. In this embodiment, one of fluid pipes 46 transfers the fluids from frame 50 to heat sink 32, and the other fluid pipe transfer the fluids in the opposite direction so as to form a circulation of the fluid in frame 50 and sink 32.

In other embodiments, any other suitable configuration of nipples 36 and 37 and pipes 46 (or other suitable elements) may be applied for exchanging the fluids between frame 50 and sink 32.

In the example of FIG. 2, the temperature of IC 44 should not exceed 100° C., and the temperature of the optical modules should not exceed 70° C. In an embodiment, the fluids used for cooling the optical modules may be used thereafter for cooling IC 44. In some embodiments, heat sink 32 is configured to divert the fluids used for cooling the optical modules, into IC cooling module 52.

In other embodiments, heat sink 32 may have two separate closed-loop piping systems, each system configured to dissipate heat from a different active device, such as IC 44 and the optical modules.

In alternative embodiments, switch 20 may comprise two or more heat sinks (instead of heat sink 32), each of which may be connected to a respective cooling module, such as module 52 and frame 50.

In other embodiments, switch 20 may comprise multiple active devices having the same allowed maximal operating temperature (e.g., two switching ICs 44). In these embodiments, heat sink 32 may have a shared bidirectional piping system for both devices, and/or any other suitable configuration of fluid management.

In alternative embodiments, heat dissipation may be carried out using a single technique among the conduction and convection techniques described above. For example, if switch 20 applies only the conduction technique, the fluids and nipples 36 and 37 will be eliminated from switch 20, and heat exchange between frame 50 and heat sink 32 may be carried out using heat-conductive rods connecting between frame 50 and heat sink 32. Similarly, heat pipes 38 may be replaced by suitable heat-conductive rods. In case switch 20 applies only the convection cooling technique, fans 42 and possibly fins 54 may be eliminated. Further embodiments of the heat dissipation techniques are depicted in FIG. 3 below.

Figure 3:
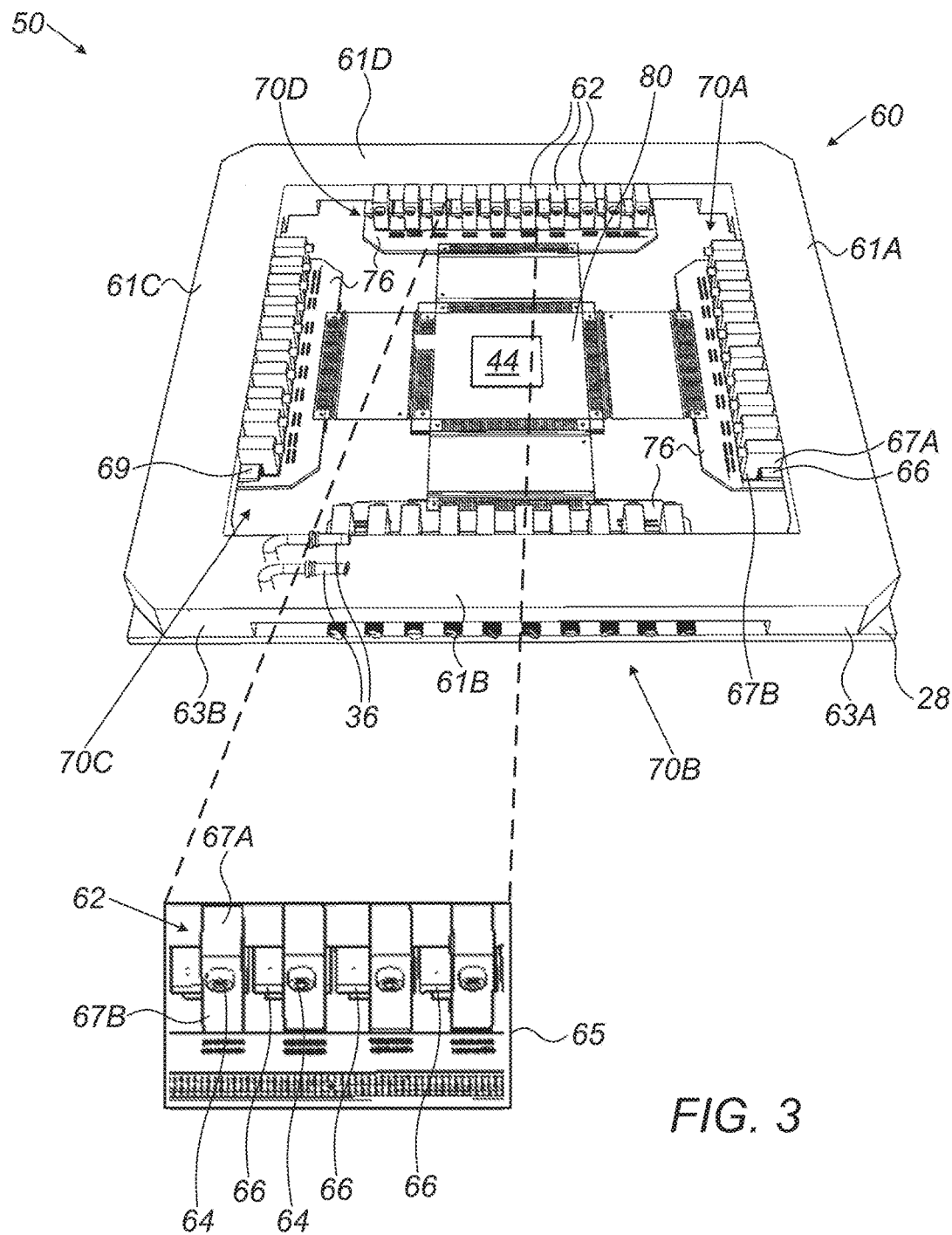
FIG. 3 is a schematic, pictorial illustration of a thermo-mechanical frame of a switch, in accordance with an embodiment of the present invention.

FIG. 3 is a schematic, pictorial illustration of thermomechanical frame 50 of switch 20, in accordance with an embodiment of the present invention. In some embodiments, frame 50, which serves as a cooling module, is mounted on support plate 28 and is configured to dissipate heat from multiple (e.g., four) optical modules 70A, 70B, 70C and 70D, of switch 20.

In some embodiments, frame 50 comprises a bridge 60 made from a heat-conductive material, such as copper, which also provides mechanical strength to frame 50. In an embodiment, bridge 60 comprises four sections 61A, 61B, 61C and 61D that form a square-shaped bridge mounted on support plane 28. In an embodiment, bridge 60 comprises four pillars, such as pillars 63A and 63B, mounted at the corners of support plate 28 and are configured to mechanically support sections 61A, 61B, 61C and 61D above optical modules 70A, 70B, 70C and 70D, respectively.

In some embodiments, bridge 60 and the pillars are hollow (and/or comprise fluid pipes), so as to enable a closed-loop flow of fluids therein. In other embodiments, the closed loop may further comprise heat pipes embedded in support plate 28 (not shown), so as to increase the rate of heat dissipation from optical modules 70A, 70B, 70C and 70D.

In other embodiments, frame 50 is configured to dissipate the heat from modules 70A, 70B, 70C and 70D using heat conduction techniques, as described in FIG. 2 above. In these embodiments, frame 50 does not contain cooling fluids and may have a solid rather than hollow profile, so as to increase the heat dissipation rate through the conductive material (e.g., copper) of frame 50.

In some embodiments, each of sections 61A, 61B, 61C and 61D is configured to dissipate heat from a respective optical module 70A, 70B, 70C and 70D. For example, section 61D is mounted above optical module 70D, and is configured to conduct heat from module 70D to heat sink 32, via pipes 46 and nipples 36 and 37, as described in FIG. 2 above.

Reference is now made to an inset 65. In some embodiments, frame 50 comprises multiple heat slugs 62, mounted on section 61D of bridge 60. Each heat slug 62 is made from a heat-conductive material, such as copper, and is configured to conduct heat from a respective optical assembly 66 to bridge 60. In an embodiment, each slug comprises two sections 67A and 67B that are coupled to one another so as to form an L-shape that can be coupled to assembly 66. Section 67A is coupled to section 61B using a fastener 64 so as to enable heat conduction from section 67A to bridge 60. Section 67B is coupled to electronic and/or electro-optical devices (not shown) mounted on substrate 76. These electro-optical devices are typically made of integrated circuits that generate heat, such as laser drivers, silicon photonics modulators, Trans-Impedance-Amplifiers receivers, electrical clock and data recovery (CDR) circuits, serializers/de-serializers, pulse-amplitude modulation (PAM) modulators, PAM demodulators, electrical repeaters and other suitable devices mounted on a printed circuit board (PCB) of substrate 76.

Note that optical assembly 66 comprises active devices, such as electro-optical transducers, which are configured to convert between electrical and optical signals, and undesirably, to produce excess heat during operation.

Reference is now made back to the main section of FIG. 3. As shown in module 70A, section 67A of heat slug 62 is coupled to section 61A of bridge 60. In an embodiment, sections 67A and 67B are both in direct contact with optical assembly 66 so as to dissipate heat therefrom. In another embodiment, only one section among sections 67A and 67B is in direct contact with assembly 66.

In some embodiments, switch 20 comprises a single type of optical assemblies 66. In other embodiments, switch 20 may comprise other types of optical and/or electrical assemblies, in addition to or instead of assemblies 66.

For example, Module 70D may comprise only optical assembles 66 and module 70C may comprise optical assemblies 69 having different physical dimensions (e.g., length and width) than assemblies 66.

In alternative embodiments, at least one module (e.g., module 70A) comprises multiple types of optical assemblies (e.g., assemblies 66 and 69). In these embodiments, the length of sections 67A and 67B is adapted to fit the dimensions of, and to dissipate heat from the respective optical assemblies. In these embodiments, module 70A is configured to exchange different types of signals with IC 44 and/or connectors 26, by operating different types of optical assemblies.

In other embodiments, modules 70A, 70B, 70C and 70D may comprise one or more electrical assemblies (not shown) instead of, or in conjunction with the optical assemblies. In these embodiments, heat slugs 62 are adapted to fit any shape of any optical and/or electrical assemblies by setting the length of sections 67A and 67B, or by selecting other suitable types of heat slugs.

In other embodiments, modules 70A, 70B, 70C and 70D may comprise of one or more smaller assemblies (not shown) instead of a single large module. These smaller modules will ensure a higher assembly yield for the complete assembly. In these small modules embodiments, heat slugs are adapted to fit any shape of any optical and/or electrical assemblies by setting the length of sections 67A and 67B, or by selecting other suitable types of heat slugs.

These embodiments enable the operation of multiple types of optical and/or electrical modules on the same switch, thereby increasing the versatility and functionality of switch 20.

Figure 4:
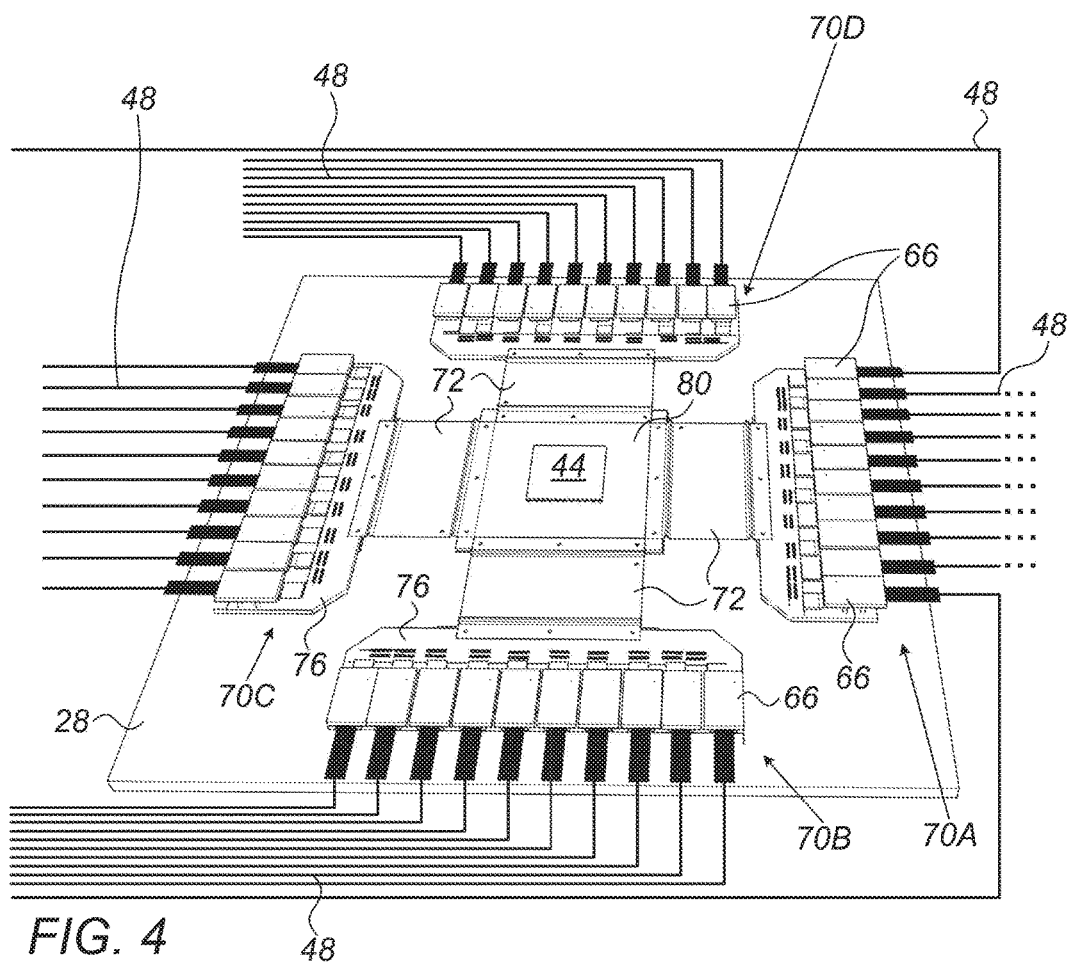
FIG. 4 is a schematic, top view illustration of a switch, in accordance with an embodiment of the present invention.

FIG. 4 is a schematic, top view illustration of IC 44 and the optical modules of switch 20, in accordance with an embodiment of the present invention. FIG. 4 shows IC 44 and optical modules 70A 70B, 70C and 70D mounted on support plate 28. It will be understood that, for the sake of clarity, FIG. 4 excludes elements such as the extension of optical fibers 48, front panel 24, and the heat dissipation modules depicted in FIG. 2 above.

In some embodiments, IC 44 is mounted on package substrate 80, which is mounted at the center of plate 28. In an embodiment, modules 70A, 70B, 70C and 70D are mounted on plate 28 arranged in a square surrounding substrate 80.

In an embodiment, substrate 80 may comprise a core and sequential build up layers, which are connected using large plugs, such as vias. In another embodiment, substrate 80 may be "coreless," i.e., comprise sequential build up layers without a core.

In some embodiments, switch 20 comprises one or more jumpers 72, each jumper 72 configured to electrically connect between substrate 80 and substrate 76 of a respective optical module, such as module 70A. In an embodiment, jumper 72 is made from a flexible PCB and comprises an array of bumps (not shown) disposed on its lower surface at high density (e.g., at 0.5 mm bump pitch or any other configuration) so as to conduct the electrical communication signals between substrates 80 and 76.

In another embodiment, jumper 72 is made from any other suitable flexible material, such as a liquid crystal polymer (LCP) mounted on substrates 80 and 76 using mounting screws and/or stiffener brackets. In an embodiment, a jumper 72 made from LCD polymer is configured to conduct communication signals having a frequency on the order of 110 Giga Hertz (GHz).

In another embodiment, jumper is mounted on substrates 80 and 76 using mounting screws and/or stiffener brackets, as well as a vertical electrical interposer connector such as a "Fuzz button" connector produced by Custom Interconnects of Centennial, Colo. or a Compression Land Grid Array connector produced by Amphenol Intercom Systems or Hirose Electric USA of Simi Valley, Calif.

Note that in some configurations of switch 20, the upper surfaces of substrates 76 and 80 may be at different heights relative to plate 28, therefore it is important that jumper 72 be flexible. In other configurations, the upper surfaces of substrates 76 and 80 may be at the same height relative to plate 28 so that jumper 72 does not necessarily have to be flexible.

During the operation of switch 20, the communication signals are conducted between input/output (I/O) ports of IC 44 and modules 70A, 70B, 70C and 70D, via substrates 76 and 80, and jumper 72.

Communication signals are exchanged between switch 20 and other entities of data center 10 at high data rates. For example, data rate of 100 GigaBits per second (GBPS) per lane is transmitted between switch 20 and a similar switch of another rack 12, at a typical frequency on an order of 60-70 GHz. Transmission of communication signals at such frequencies over electrical cables for a distance longer than a few meters, typically degrades the quality of the transmitted signal.

For example, at 100 GBPS, transmission over optical fibers typically provides better signal integrity and enables higher transmission distance between two switches (e.g., from 3 meters to 100 meters) compared to transmission over electrical cables. Moreover, IC 44, which typically transmits the signals over the electrical cable, produces excess heat that may cause an operational failure of switch 20.

In an embodiment, IC 44 is mounted on substrate 80 so that the I/O interfaces of IC 44 are located at an equidistance from each respective module among modules 70A, 70B, 70C and 70D. The equidistance refers to the lengths of electrical traces (not shown) of substrates 80 and 76, and jumper 72. In this embodiment, all the traces connecting between IC 44 and the respective optical modules have a substantially uniform length, which is also minimized in length, so as to reduce the rate of signal distortion and signal-loss in switch 20.

In some embodiments, each of the optical modules may comprise an exemplary range of 10-20 optical assemblies 66 (or other type of assemblies described in FIG. 3 above), so that in total switch 20 may comprise 40-80 assemblies 66 that are connected, via fibers 48 (or electrical cables) to front panel 24.

In order to increase the traffic-carrying capacity of switch 20, it is desirable to increase the number of assemblies 66 and I/O ports in panel 24. The standard dimensions of rack 12 (e.g., 1 U) restricts the maximal length and width of switch 20 so that the width of each connector 26 and assembly 66 has to be reduced in order to increase the traffic-carrying capacity of switch 20.

For example, typical outer dimensions of a Quad Small Form-factor Pluggable (QSFP) connector are (H×W×D) 13.5×18.4×72.4 mm, thereby limiting the maximal number of ports to 40.

In an embodiment, by reducing the width of connector 26 to an order of 10 mm or 6.5 mm (instead of 18.4 mm of the QSFP), panel 24 can incorporate a larger number (e.g., 64 or 72) port connectors 26, thereby increasing the traffic-carrying capacity of switch 20 compared to legacy switches. Similarly, the number of assemblies 66 incorporated on plate 28 may increase (compared to legacy systems) by scaling the width of assembly 66.

FIG. 5A is a schematic, pictorial illustration of jumper 72 of switch 20, in accordance with an embodiment of the present invention. In an embodiment, jumper 72 has a rectangular shape so that the electrical signals between substrates 76 and 80 are conducted, substantially orthogonally relative to the nearest edge of substrate 76.

In this embodiment, the electrical signals conducted from IC 44 to assemblies 66A and 66B have a different travelling distance, which may affect the uniformity of the output signals from switch 20. This non-uniformity may limit the total number of assemblies 66 on module 70D.

In some embodiments, each module among modules 70A, 70B, 70C and 70D) comprises DC block capacitors 77, which are configured to block DC signals from entering assembly 66.

FIG. 5B is a schematic, pictorial illustration of a jumper 74 of switch 20, in accordance with another embodiment of the present invention. Jumper 74 may replace, for example, jumper 72 of switch 20.

In some embodiments, jumper 74, which is made from the same materials or jumper 72, has a trapezoid shape. This shape enables reducing the sum of lengths of all traces connecting between IC 44 and assemblies 66 of module 70D (and similarly, between IC 44 and the respective assemblies of modules 70A, 70B and 70C.)

Furthermore, the trapezoid shape enables higher uniformity of the travelling distance of the electrical signals in substrate 76, thereby enabling an increase of the number of assemblies 66 that can be incorporated in module 70D (and the other optical modules).

In other embodiments, jumpers 72 and 74 may have a different shape, such as square, multiple stripes, or any other suitable shape. For example, multiple individual jumper stripes and/or a jumper that splits into multiple stripes enable connecting IC 44 to multiple small individual modules (each comprising one or more assemblies 66) rather than to a single large module, such as module 70D.

Figure 6:
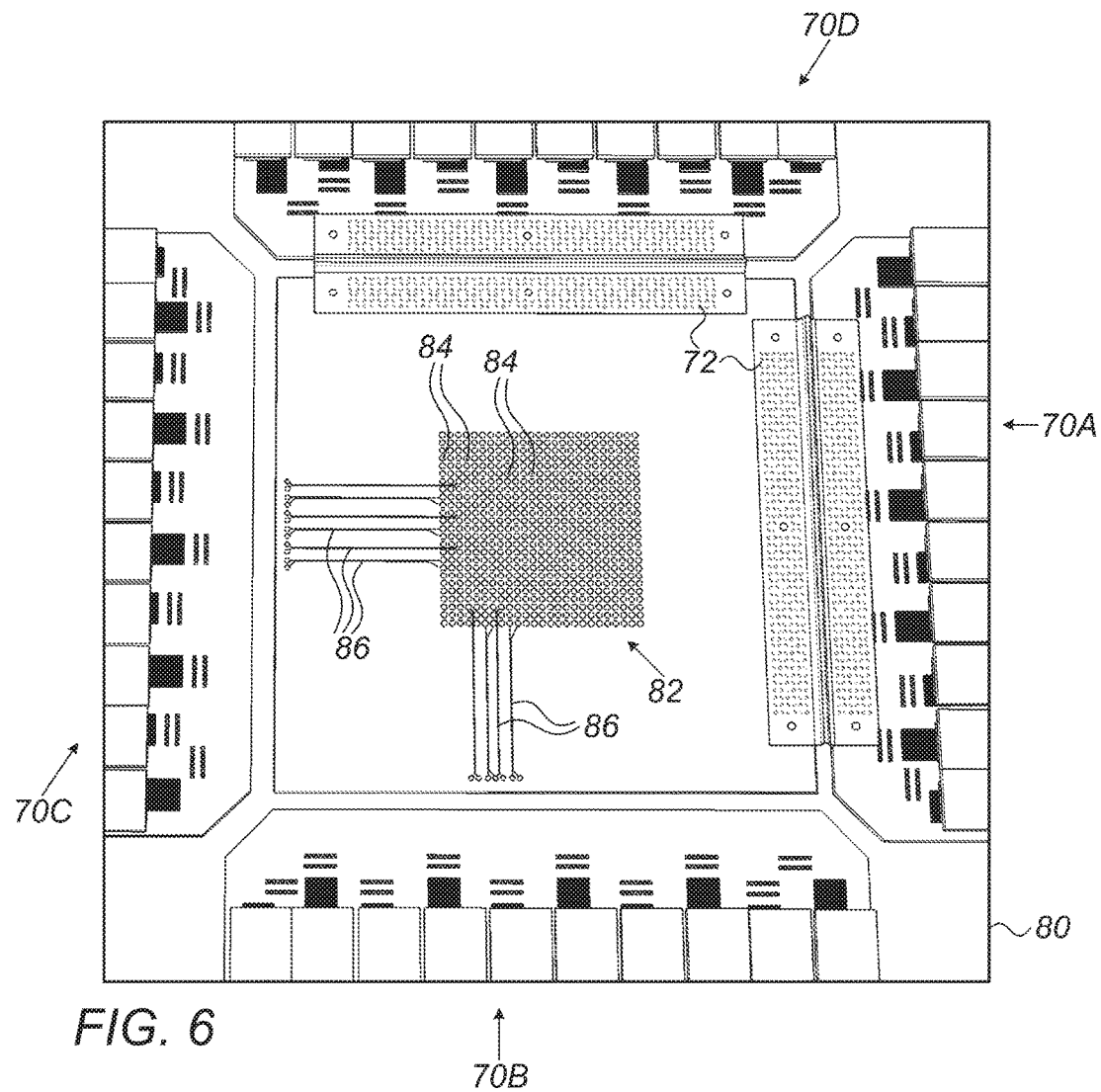
FIG. 6 is a schematic, pictorial illustration of a package substrate, in accordance with an embodiment of the present invention.

FIG. 6 is a schematic, pictorial illustration of package substrate 80, in accordance with an embodiment of the present invention. In some embodiments, substrate 80 comprises multiple electrical attachment pads 84, such as pads designed and made for soldering or any other suitable technique, arranged in an array 82.

In an embodiment, IC 44 is electrically connected to substrate 80 via pads 84 and bumps (not shown) that are formed on the surface of IC 44 facing substrate 80.

In some embodiments, substrate 80 further comprises differential traces 86, which are configured to conduct electrical signals, such as high-speed data signal (e.g., communication signals) between I/O channels (not shown) of IC 44 and jumper 72. In the example of FIG. 6, two of jumpers 72 are removed for the sake of clarity, so as to show how traces 86 are extended below jumper 72. In an embodiment, traces 86 are patterned in substrate 80 so that the bumps of jumper 72 are connected with the ends of traces 86. It will be understood that substrate 80 comprises traces 86 extending from pads 84 of array 82 to all optical modules 70A, 70B, 70C and 70D.

In some embodiments, some of pads 84 are configured to conduct electrical power received from PSU 34, or from an external power source. Other pads 84 of array 82 are further configured to conduct low-speed signals, such as bus control signals, between IC 44 and external circuitry (not shown).

Conducting Communication Signals and Control Signals Using Different Electrical Connections In some embodiments, IC 44 receives power from PSU 34 (or from the external power source) and exchanges two types of signals via pads 84. As described in FIG. 4 above, IC 44 exchanges high-speed communication signals with modules 70A, 70B, 70C and 70D, or with any other suitable electro-optical transducers. These high-speed signals are exchanged at a typical frequency range of 60-70 GHz, or at any other suitable frequency.

In an embodiment, IC 44 further exchanges low-speed signals, such as bus control signals, with external circuitry, such as a switch controller (not shown), at a typical frequency of 5 to 6 GHz.

Figure 7:
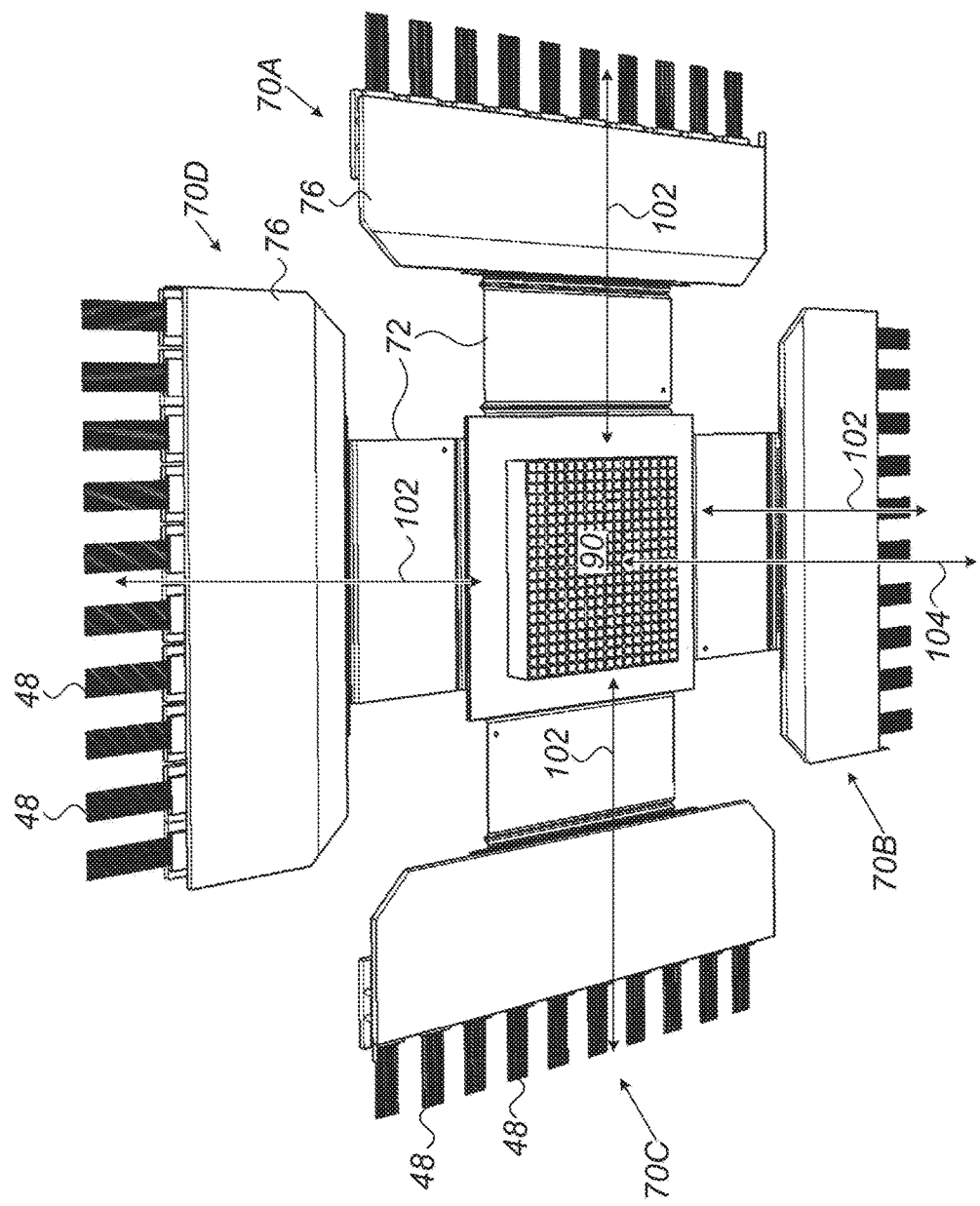
FIG. 7 is a schematic, bottom view illustration of a switch, in accordance with an embodiment of the present invention.

FIG. 7 is a schematic, bottom-view illustration of switch 20, in accordance with an embodiment of the present invention. For the sake of clarity, only IC 44 and the optical modules are shown on their respective substrates, so as to depict how the high-speed and low-speed signals are conducted in different channels, using different electrical connections.

In some embodiments, as shown by arrows 102, the high-speed communication signals are conducted between IC 44 and modules 70A, 70B, 70C and 70D via electrical connections, such as substrates 70 and 80 and jumper 72, which extend from IC 44 on a plane substantially parallel to substrate 80.

In some embodiments, switch 20 comprises a mezzanine connector 90, which comprises 300-500 connecting pins (or any other suitable number), and is fitted into an opening in support plate 28. In an embodiment, connector 90 is electrically coupled to pads 84 of substrate 80, and is configured to conduct the low-speed control signals on one or more planes that are not parallel (e.g., orthogonal) to substrate 80 as shown by an arrow 104. In this embodiment, the low-speed control signals are typically conducted below the plane of IC 44, but can be conducted at any other location relative to the plane of IC 44.

In an embodiment, connector 90 is further configured to receive electrical power from the power source, which is used for the operation of IC 44, and possibly other power consumers of switch 20. As such, the power signals are also provided via connections in one or more planes that are not parallel (e.g., orthogonal) to substrate 80.

Based on these embodiments, the high-speed communication signals are conducted in optical and/or electrical channels, and are separated from the power and low-speed control signals, which are conducted only in other electrical channels.

Figure 8:
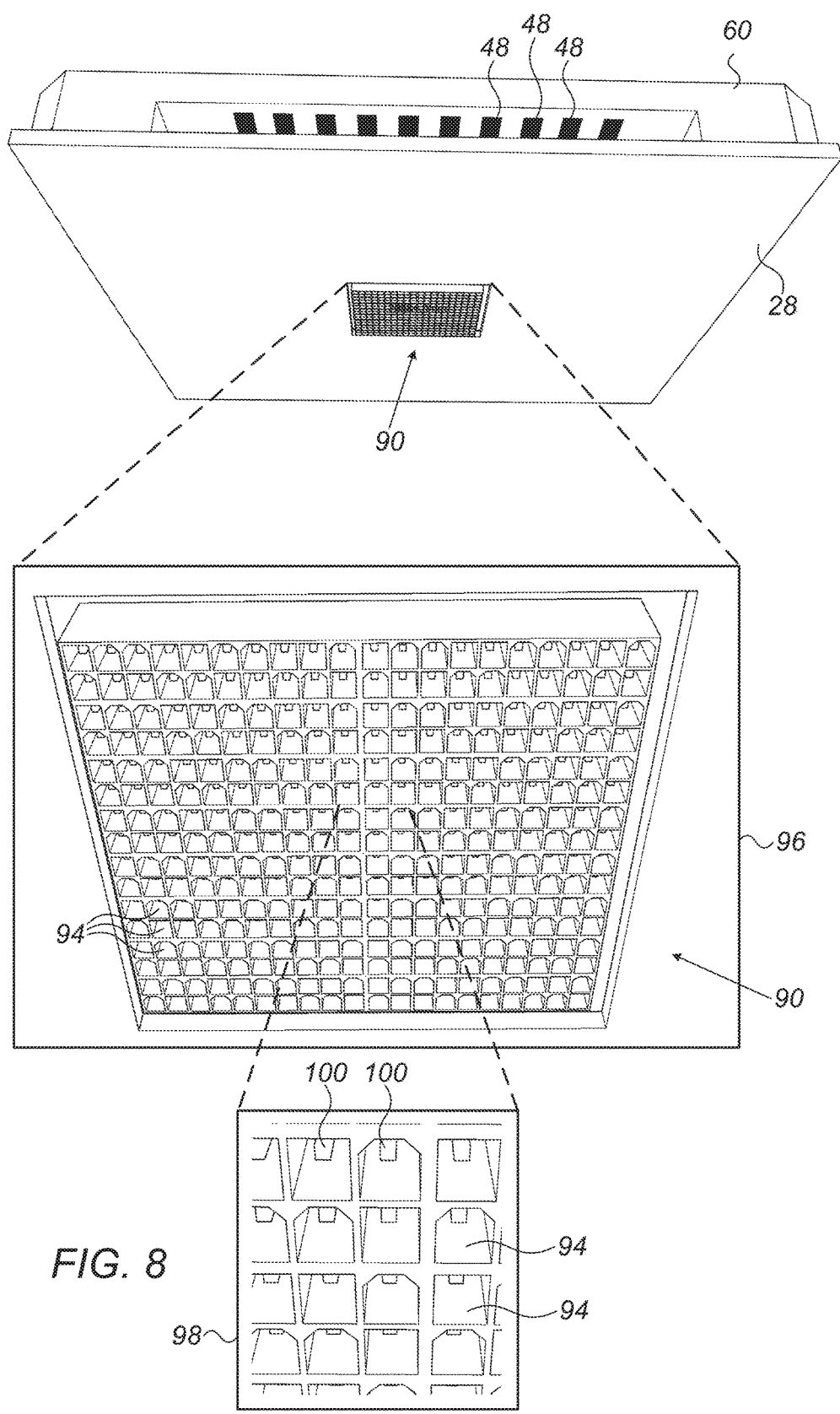
FIG. 8 is a schematic, bottom-view illustration of a support plate of a switch, in accordance with an embodiment of the present invention.

FIG. 8 is a schematic, bottom-view illustration of support plate 28, in accordance with an embodiment of the present invention. In some embodiments, mezzanine connector 90 is fitted into an opening in plate 28 so as to conduct power from the power source into IC 44, and to exchange low-speed signals such as bus control signals, between IC 44 and the external circuitry (not shown).

In other embodiments, switch 20 may comprise a plurality of mezzanine connectors. For example, an additional mezzanine connector may be fitted to at least one optical module among modules 70A, 70B, 70C, 70D.

In alternative embodiments, at least one of the optical modules may comprise multiple sub-modules (not shown), each comprising, for example, one or more assemblies 66. In these embodiments, a mezzanine connector may be fitted to each of the respective sub-modules.

Reference is now made to insets 96 and 98. In an embodiment, switch 20 comprises a complementary mezzanine connector or connectors (not shown), which is configured to connect between switch 20, the power supply and circuitry (not shown) to mezzanine connector 90 or the multiple mezzanine connectors described above. In some embodiments, connector 90 is configured to fit into an electrical connector, such as a female socket (not shown) mounted on a PCB of switch 20.

In some embodiments, connector 90 comprises multiple sub-connectors 94. Each sub-connector 94 comprises at least one connecting pin 100, which is electrically connected to one or more pads 84 of substrate 80. In an embodiment, each connecting pin 100 is configured to fit into a respective sub-connector of the female socket, and to conduct the low-speed signals and the power between pads 84 and the socket of rack 12.

Although the embodiments described herein mainly address communication switching systems, the methods and systems described herein can also be used in other applications, such as in computing, data processing, memory controllers, data analysis of medical systems, defense optical sensing for military, transportation, aviation, autonomous cars, to name only a few examples.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus, comprising:
   an Integrated Circuit (IC), which is mounted on a substrate and is configured to exchange one or more communication signals with one or more electro-optical transducers, and to exchange one or more control signals with external circuitry; and
   an array of electrical interconnections soldered to the IC, the array comprising:
      first electrical connections, which extend on a plane parallel to the substrate, and are configured to conduct the communication signals; and
      second electrical connections, which extend on one or more planes not parallel to the substrate, and are configured to conduct the control signals.

2. The apparatus according to claim 1, wherein the second electrical connections are configured to conduct electrical power from an external power source.

3. The apparatus according to claim 1, wherein the first electrical connections comprise a jumper, which is configured to conduct the communication signals between the substrate and the electro-optical transducers.

4. The apparatus according to claim 3, wherein the jumper has a shape selected from a list consisting of rectangular, square, and trapezoid.

5. The apparatus according to claim 3, wherein the jumper comprises one or more components selected from a list consisting of printed circuit board (PCB), flexible PCB, and liquid crystal polymer (LCP).

6. The apparatus according to claim 3, wherein the jumper comprises multiple stripes, and wherein each stripe is configured to conduct one or more of the communication signals between the substrate and a respective electro-optical transducer.

7. The apparatus according to claim 1, wherein the substrate comprises first electrical attachment pads connected to the first electrical connections, and second electrical attachment pads connected to the second electrical connections.

8. The apparatus according to claim 1, wherein the second electrical connections comprise a mezzanine connector, which comprises multiple connecting pins.

9. The apparatus according to claim 1, and comprising (i) a first heat dissipation module, which is configured to transfer first heat from the IC to a heat sink, and (ii) a second heat dissipation module, which is configured to transfer second heat from the electro-optical transducers to the heat sink.

10. The apparatus according to claim 9, wherein the first and second heat dissipation modules are thermally isolated from one another.

11. The apparatus according to claim 9, wherein the first and second heat dissipation modules are thermally connected to one another.

12. The apparatus according to claim 9, wherein at least one of the first and second heat dissipation modules is configured to transfer heat using heat conduction.

13. The apparatus according to claim 9, wherein at least one of the first and second heat dissipation modules is configured to transfer heat using a combination of heat conduction and heat convection.

14. The apparatus according to claim 9, wherein at least one of the first and second heat dissipation modules is configured to transfer heat using heat convection.

15. The apparatus according to claim 14, wherein one of the first and second heat dissipation modules, which is configured to transfer the heat using heat convection, comprises one or more heat pipes configured to run a cooling fluid.

16. The apparatus according to claim 9, wherein the second heat dissipation module comprises one or more heat slugs, and wherein each heat slug comprises a fastener, which is configured to couple the heat slug to a corresponding electro-optical transducer.

17. The apparatus according to claim 16, wherein the electro-optical transducers comprise first and second electro-optical transducers that differ in size, and wherein the heat slugs comprise a first heat slug, which is configured to couple to the first electro-optical transducer, and a second heat slug, which is configured to couple to the second electro-optical transducer.

18. The apparatus according to claim 17, wherein the first and second heat slugs differ in size.

19. A method, comprising:
   exchanging one or more communication signals between an Integrated Circuit (IC) and one or more electro-optical transducers, via first electrical connections comprised in an array of electrical interconnections soldered to the IC, wherein the first electrical connections extend on a plane parallel to a substrate on which the IC is mounted; and
   exchanging one or more control signals between the IC and external circuitry, via second electrical connections comprised in the array of the electrical interconnections, wherein the second electrical connections extend on one or more planes not parallel to the substrate.

20. A method, comprising:
   mounting an Integrated Circuit (IC) on a substrate;
   connecting the IC to one or more electro-optical transducers using first electrical connections that conduct communication signals, wherein the first electrical connections are comprised in an array of electrical interconnections soldered to the IC and extend on a plane parallel to the substrate; and
   connecting between the IC and external circuitry using second electrical connections that conduct control signals, wherein the second electrical connections are comprised in the array of the electrical interconnections and extend on one or more planes not parallel to the substrate.

* * * * *